United States Patent
George et al.

(10) Patent No.: US 9,452,351 B2
(45) Date of Patent: Sep. 27, 2016

(54) GAMING MACHINE WITH PROXIMITY SENSING TOUCHLESS DISPLAY

(71) Applicant: KONAMI GAMING, INC., Las Vegas, NV (US)

(72) Inventors: Jeffrey George, Las Vegas, NV (US); Edward Sepich, Henderson, NV (US); Thomas E. Soukup, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 14/014,188

(22) Filed: Aug. 29, 2013

(65) Prior Publication Data

US 2014/0135118 A1 May 15, 2014

Related U.S. Application Data

(63) Continuation of application No. 13/312,791, filed on Dec. 6, 2011, now Pat. No. 8,545,322, which is a continuation of application No. 11/841,206, filed on Aug. 20, 2007, now abandoned, which is a (Continued)

(51) Int. Cl.
*A63F 9/24* (2006.01)
*A63F 13/20* (2014.01)
(Continued)

(52) U.S. Cl.
CPC .............. *A63F 13/06* (2013.01); *A63F 13/20* (2014.09); *A63F 13/428* (2014.09); *G06F 3/041* (2013.01);
(Continued)

(58) Field of Classification Search
CPC ...... G06F 3/017; G06F 3/011; G06F 3/0346; G06F 3/03547; G06F 3/0481; G06F 3/04847; G06F 21/36; G06F 3/01; G06F 3/0304; G06F 3/0416; G06F 3/0428; G06F 2203/04101; G07F 17/32; G07F 17/3206
USPC ...................................... 463/36–38
See application file for complete search history.

(56) References Cited

U.S. PATENT DOCUMENTS

| | | |
|---|---|---|
| 4,283,709 A | 8/1981 | Lucero et al. |
| 4,339,798 A | 7/1982 | Hedges et al. |

(Continued)

FOREIGN PATENT DOCUMENTS

| | | |
|---|---|---|
| AU | 768153 | 1/2002 |
| AU | 2002301067 B2 | 6/2003 |

(Continued)

OTHER PUBLICATIONS

Wang, Z. et al. "Casino Technology: Player Tracking and Slot Accounting Systems", UNLV Gaming Research & Review Journal, Jan. 1, 2001 pp. 1-11 vol. 6, Issue 6, Board of Regents of the University and the Community College System of Nevada on behalf of the University of Nevada, Las Vegas, Copyright 2001.

(Continued)

*Primary Examiner* — Justin Myhr
(74) *Attorney, Agent, or Firm* — Howard & Howard Attorneys PLLC

(57) ABSTRACT

A device for providing a proximity sensing touchless display to a gaming machine is provided. The device includes a processor, a display coupled to the processor, and a touchless input interface coupled to the processor and being implemented by the display for receiving input from the player. The input interface employs proximity sensing technology, such as but not limited to proximity button activation. For example, the display can be operable to sense a player's approaching finger entering an electrical field (e.g., corresponding to one or more electrodes) such that a particular button or function on the interface can be activated without the player's finger having to ever physically contact a button, push pad, keypad, touch screen, and/or the like.

29 Claims, 6 Drawing Sheets

Related U.S. Application Data continuation-in-part of application No. 10/661,128, filed on Sep. 12, 2003, now abandoned, which is a continuation-in-part of application No. 09/967,571, filed on Sep. 28, 2001, now abandoned, said application No. 11/841,206 is a continuation-in-part of application No. 11/094,605, filed on Mar. 30, 2005, now Pat. No. 7,303,475, which is a continuation of application No. 09/967,571, filed on Sep. 28, 2001, now abandoned.

(60) Provisional application No. 60/823,047, filed on Aug. 21, 2006, provisional application No. 60/502,179, filed on Sep. 11, 2003.

(51) Int. Cl.
*A63F 13/428* (2014.01)
*G06F 3/041* (2006.01)
*G07F 17/32* (2006.01)

(52) U.S. Cl.
CPC .......... *G07F 17/32* (2013.01); *G07F 17/3209* (2013.01); *G07F 17/3211* (2013.01); *G07F 17/3227* (2013.01); *G07F 17/3234* (2013.01); *G07F 17/3237* (2013.01); *G07F 17/3239* (2013.01)

(56) References Cited

U.S. PATENT DOCUMENTS

| | | |
|---|---|---|
| 4,448,419 A | 5/1984 | Teinaes |
| 4,636,951 A | 1/1987 | Harlick |
| 4,782,468 A | 11/1988 | Jones et al. |
| 4,948,138 A | 8/1990 | Pease et al. |
| 5,038,022 A | 8/1991 | Lucero |
| 5,116,055 A | 5/1992 | Tracy |
| 5,152,529 A | 10/1992 | Okada |
| 5,249,800 A | 10/1993 | Hilgendorf et al. |
| 5,265,874 A | 11/1993 | Dickinson et al. |
| 5,280,909 A | 1/1994 | Tracy |
| 5,311,175 A | 5/1994 | Waldman |
| 5,321,241 A | 6/1994 | Craine |
| 5,332,076 A | 7/1994 | Ziegert |
| 5,342,047 A | 8/1994 | Heidel et al. |
| 5,395,111 A | 3/1995 | Inoue |
| 5,429,361 A | 7/1995 | Raven et al. |
| 5,457,306 A | 10/1995 | Lucero |
| 5,470,079 A | 11/1995 | LeStrang et al. |
| 5,472,194 A | 12/1995 | Breeding et al. |
| 5,547,202 A | 8/1996 | Tsumura |
| 5,559,312 A | 9/1996 | Lucero |
| 5,564,700 A | 10/1996 | Celora |
| 5,579,037 A * | 11/1996 | Tahara et al. ............... 345/173 |
| 5,580,055 A | 12/1996 | Hagiwara |
| 5,609,524 A | 3/1997 | Inoue |
| 5,611,535 A | 3/1997 | Tiberio |
| 5,611,730 A | 3/1997 | Weiss |
| 5,624,119 A | 4/1997 | Leake |
| 5,655,961 A | 8/1997 | Acres et al. |
| 5,655,966 A | 8/1997 | Werdin, Jr. et al. |
| 5,674,128 A | 10/1997 | Holch et al. |
| 5,702,304 A | 12/1997 | Acres et al. |
| 5,707,287 A | 1/1998 | McCrea, Jr. |
| 5,722,891 A | 3/1998 | Inoue |
| 5,735,525 A | 4/1998 | McCrea, Jr. |
| 5,741,183 A | 4/1998 | Acres et al. |
| 5,752,881 A | 5/1998 | Inoue |
| 5,752,882 A | 5/1998 | Acres et al. |
| 5,762,552 A | 6/1998 | Vuong et al. |
| 5,766,076 A | 6/1998 | Pease et al. |
| 5,770,533 A | 6/1998 | Franchi |
| 5,800,268 A | 9/1998 | Molnick |
| 5,800,269 A | 9/1998 | Holch et al. |
| 5,807,172 A | 9/1998 | Piechowiak |
| 5,811,772 A | 9/1998 | Lucero |
| 5,819,901 A | 10/1998 | Filiberti |
| 5,820,459 A | 10/1998 | Acres et al. |
| 5,836,817 A | 11/1998 | Acres et al. |
| 5,844,506 A | 12/1998 | Binstead |
| 5,851,149 A | 12/1998 | Xidos et al. |
| 5,855,515 A | 1/1999 | Pease et al. |
| 5,876,284 A | 3/1999 | Acres et al. |
| 5,885,158 A | 3/1999 | Torango et al. |
| 5,902,983 A | 5/1999 | Crevelt et al. |
| 5,911,626 A | 6/1999 | McCrea, Jr. |
| 5,919,091 A | 7/1999 | Bell et al. |
| 5,923,267 A | 7/1999 | Beuk et al. |
| 5,935,004 A | 8/1999 | Tarr et al. |
| 5,944,608 A | 8/1999 | Reed et al. |
| 5,952,640 A | 9/1999 | Lucero |
| 5,959,277 A | 9/1999 | Lucero |
| 5,967,896 A | 10/1999 | Jorasch et al. |
| 5,976,016 A | 11/1999 | Moody et al. |
| 5,984,781 A | 11/1999 | Sunaga |
| 6,001,016 A | 12/1999 | Walker et al. |
| 6,007,066 A | 12/1999 | Moody |
| 6,012,984 A | 1/2000 | Roseman |
| 6,019,283 A | 2/2000 | Lucero |
| 6,039,648 A | 3/2000 | Guinn et al. |
| 6,048,269 A | 4/2000 | Burns et al. |
| 6,056,642 A | 5/2000 | Bennett |
| 6,068,552 A | 5/2000 | Walker et al. |
| 6,071,190 A | 6/2000 | Weiss et al. |
| 6,077,162 A | 6/2000 | Weiss |
| 6,080,062 A | 6/2000 | Olson |
| 6,089,982 A | 7/2000 | Holch et al. |
| 6,093,103 A | 7/2000 | McCrea, Jr. |
| 6,110,041 A | 8/2000 | Walker et al. |
| 6,110,043 A | 8/2000 | Olsen |
| 6,110,044 A | 8/2000 | Stern |
| 6,117,011 A | 9/2000 | Lvov |
| 6,117,012 A | 9/2000 | McCrea, Jr. |
| 6,126,546 A | 10/2000 | Reed et al. |
| 6,130,663 A | 10/2000 | Null |
| 6,146,273 A | 11/2000 | Olsen |
| 6,159,096 A | 12/2000 | Yoseloff |
| 6,162,122 A | 12/2000 | Acres et al. |
| 6,183,362 B1 | 2/2001 | Boushy |
| 6,183,366 B1 | 2/2001 | Goldberg et al. |
| 6,203,010 B1 | 3/2001 | Jorasch et al. |
| 6,206,782 B1 | 3/2001 | Walker et al. |
| 6,210,275 B1 | 4/2001 | Olsen |
| 6,210,277 B1 | 4/2001 | Stefan |
| 6,210,279 B1 | 4/2001 | Dickinson |
| 6,215,417 B1 | 4/2001 | Krass et al. |
| 6,227,971 B1 | 5/2001 | Weiss |
| 6,241,607 B1 | 6/2001 | Payne et al. |
| 6,257,981 B1 | 7/2001 | Acres et al. |
| 6,299,534 B1 | 10/2001 | Breeding et al. |
| 6,309,299 B1 | 10/2001 | Weiss |
| 6,313,825 B1 | 11/2001 | Gilbert |
| 6,319,124 B1 | 11/2001 | Baerlocher et al. |
| 6,371,852 B1 | 4/2002 | Acres |
| 6,394,902 B1 | 5/2002 | Glavich et al. |
| 6,409,595 B1 | 6/2002 | Uihlein et al. |
| 6,439,993 B1 | 8/2002 | O'Halloran |
| 6,454,649 B1 | 9/2002 | Mattice et al. |
| RE37,885 E | 10/2002 | Acres et al. |
| 6,464,581 B1 | 10/2002 | Yoseloff et al. |
| 6,511,377 B1 | 1/2003 | Weiss |
| 6,517,432 B1 | 2/2003 | Jaffe |
| 6,517,433 B2 | 2/2003 | Loose et al. |
| 6,544,120 B2 | 4/2003 | Ainsworth |
| 6,604,999 B2 | 8/2003 | Ainsworth |
| 6,607,441 B1 | 8/2003 | Acres |
| 6,644,664 B2 | 11/2003 | Muir et al. |
| 6,663,487 B1 | 12/2003 | Ladner |
| 6,680,677 B1 | 1/2004 | Tiphane |
| 6,682,421 B1 | 1/2004 | Rowe et al. |
| 6,712,696 B2 | 3/2004 | Soltys et al. |
| 6,712,698 B2 | 3/2004 | Paulsen et al. |
| 6,726,204 B2 | 4/2004 | Inoue |
| 6,758,755 B2 | 7/2004 | Kelly et al. |

(56) References Cited

U.S. PATENT DOCUMENTS

| | | |
|---|---|---|
| 6,776,715 B2 | 8/2004 | Price |
| 6,800,029 B2 | 10/2004 | Rowe et al. |
| 6,803,905 B1 | 10/2004 | Capps et al. |
| 6,805,349 B2 | 10/2004 | Baerlocher et al. |
| 6,869,357 B2 | 3/2005 | Adams et al. |
| 6,880,826 B2 | 4/2005 | Inoue |
| 6,893,018 B2 | 5/2005 | Inoue |
| 6,896,615 B2 | 5/2005 | Beman |
| 6,905,408 B2 | 6/2005 | Inoue |
| 6,908,381 B2 | 6/2005 | Ellis |
| 6,910,962 B2 | 6/2005 | Marks et al. |
| 6,932,700 B2 | 8/2005 | Bennett et al. |
| 6,955,603 B2 | 10/2005 | Jeffway, Jr. et al. |
| 6,960,134 B2 | 11/2005 | Hartl et al. |
| 6,965,327 B2 | 11/2005 | Reime |
| 6,980,199 B2 | 12/2005 | Rekimoto |
| 7,056,213 B2 | 6/2006 | Ching et al. |
| 7,078,911 B2 | 7/2006 | Cehelnik |
| 7,179,166 B1 | 2/2007 | Abbott |
| 7,187,368 B2 | 3/2007 | Rekimoto |
| 7,214,132 B2 | 5/2007 | Inoue |
| 7,237,775 B2 | 7/2007 | Thomas et al. |
| 7,252,589 B1 | 8/2007 | Marks et al. |
| 7,311,602 B2 | 12/2007 | Inoue |
| 7,316,395 B1 | 1/2008 | Kromydas |
| 7,479,061 B2 | 1/2009 | Okada |
| 7,690,984 B2 | 4/2010 | Tran et al. |
| 8,576,181 B2 * | 11/2013 | Cho .................... 345/173 |
| 2001/0044337 A1 * | 11/2001 | Rowe et al. ............. 463/29 |
| 2002/0039920 A1 | 4/2002 | Bryant |
| 2002/0123378 A1 | 9/2002 | Bucknail et al. |
| 2002/0142825 A1 | 10/2002 | Lark et al. |
| 2002/0142846 A1 | 10/2002 | Paulsen |
| 2002/0151357 A1 | 10/2002 | Acres |
| 2002/0155887 A1 | 10/2002 | Criss-Puskiewicz |
| 2002/0156692 A1 | 10/2002 | Squeglia et al. |
| 2002/0165023 A1 | 11/2002 | Brosnan et al. |
| 2002/0173354 A1 | 11/2002 | Winans et al. |
| 2002/0196238 A1 | 12/2002 | Tsukada et al. |
| 2003/0013517 A1 | 1/2003 | Bennett et al. |
| 2003/0027611 A1 | 2/2003 | Recard |
| 2003/0028480 A1 | 2/2003 | Rowe |
| 2003/0032479 A1 | 2/2003 | LeMay et al. |
| 2003/0036425 A1 | 2/2003 | Kaminkow et al. |
| 2003/0054868 A1 | 3/2003 | Paulsen et al. |
| 2003/0054881 A1 | 3/2003 | Hedrick et al. |
| 2003/0067112 A1 | 4/2003 | Grauzer et al. |
| 2003/0069071 A1 | 4/2003 | Britt et al. |
| 2003/0087687 A1 | 5/2003 | Locke et al. |
| 2003/0098871 A1 * | 5/2003 | Kawano .......... G06F 3/041 345/619 |
| 2003/0132913 A1 | 7/2003 | Issinski |
| 2003/0148808 A1 | 8/2003 | Price |
| 2003/0153381 A1 | 8/2003 | Slattery |
| 2004/0012145 A1 | 1/2004 | Inoue |
| 2004/0014516 A1 | 1/2004 | Inoue |
| 2004/0014517 A1 | 1/2004 | Inoue |
| 2004/0017041 A1 | 1/2004 | Inoue |
| 2004/0026854 A1 | 2/2004 | Inoue |
| 2004/0036218 A1 | 2/2004 | Inoue |
| 2004/0038726 A1 | 2/2004 | Inoue |
| 2004/0046795 A1 | 3/2004 | Josephson et al. |
| 2004/0048646 A1 | 3/2004 | Visocnik |
| 2004/0053663 A1 | 3/2004 | Paulsen et al. |
| 2004/0053679 A1 | 3/2004 | Getz et al. |
| 2004/0058727 A1 | 3/2004 | Marks et al. |
| 2004/0063488 A1 | 4/2004 | Berman |
| 2004/0072610 A1 | 4/2004 | White et al. |
| 2004/0116175 A1 | 6/2004 | Aida |
| 2004/0132531 A1 | 7/2004 | George et al. |
| 2004/0137978 A1 | 7/2004 | Cole et al. |
| 2004/0142750 A1 | 7/2004 | Gilsson et al. |
| 2004/0198486 A1 | 10/2004 | Walker et al. |
| 2004/0209674 A1 | 10/2004 | Canover et al. |
| 2004/0219969 A1 | 11/2004 | Casey et al. |
| 2004/0254010 A1 | 12/2004 | Fine |
| 2004/0266520 A1 | 12/2004 | Aida |
| 2005/0026670 A1 | 2/2005 | Lardie |
| 2005/0043083 A1 | 2/2005 | Inoue |
| 2005/0043084 A1 | 2/2005 | Inoue |
| 2005/0088409 A1 | 4/2005 | Van Berkel |
| 2005/0159208 A1 | 7/2005 | Pacey |
| 2005/0277460 A1 | 12/2005 | Inoue |
| 2006/0025212 A1 | 2/2006 | Griswold et al. |
| 2006/0038655 A1 | 2/2006 | Hauke |
| 2006/0046830 A1 | 3/2006 | Webb |
| 2006/0052155 A1 | 3/2006 | Inoue |
| 2006/0084492 A1 | 4/2006 | Baerlocker et al. |
| 2006/0084498 A1 | 4/2006 | Baerlocker et al. |
| 2006/0166727 A1 | 7/2006 | Burak |
| 2006/0166731 A1 | 7/2006 | Yoshimi et al. |
| 2006/0183533 A1 | 8/2006 | Tran et al. |
| 2006/0183534 A1 | 8/2006 | Yoshimi |
| 2006/0247002 A1 | 11/2006 | Yoshimi et al. |
| 2006/0287060 A1 | 12/2006 | Yoshimi |
| 2007/0015565 A1 | 1/2007 | Chan |
| 2007/0101283 A1 | 5/2007 | Miyamoto |
| 2007/0120834 A1 | 5/2007 | Boillot |
| 2007/0124694 A1 | 5/2007 | Van De et al. |
| 2007/0125633 A1 | 6/2007 | Boillot |
| 2007/0126696 A1 | 6/2007 | Boillot |
| 2007/0130547 A1 | 6/2007 | Boillot |
| 2007/0270203 A1 | 11/2007 | Aida |
| 2007/0288194 A1 | 12/2007 | Boillot |
| 2008/0045300 A1 | 2/2008 | Quayle et al. |
| 2008/0045323 A1 | 2/2008 | Berman |
| 2008/0059915 A1 | 3/2008 | Boillot |
| 2009/0082087 A1 | 3/2009 | Pacey et al. |
| 2009/0227332 A1 | 9/2009 | Yoshizawa |

FOREIGN PATENT DOCUMENTS

| | | |
|---|---|---|
| AU | 2004203045 A1 | 7/2004 |
| EP | 1 096 438 A2 | 5/2001 |
| JP | 6-246043 A | 9/1994 |
| JP | 2002-325881 A | 11/2002 |
| JP | 2003-236055 A | 8/2003 |
| WO | 03/026381 A2 | 4/2003 |
| WO | 2005-116801 A2 | 12/2005 |

OTHER PUBLICATIONS

International Search Report—date of mailing Apr. 22, 2005.
Office Action for U.S. Appl. No. 11/281,258 (Notification Date Dec. 13, 2007).
Response to Office Action of Dec. 13, 2007 (dated Mar. 13, 2008) for U.S. Appl. No. 11/281,258.
Office Action for U.S. Appl. No. 11/413,707 (Notification Date Jan. 28, 2008).

* cited by examiner

GAMING MACHINE WITH PROXIMITY SENSING TOUCHLESS DISPLAY

CROSS-REFERENCE TO RELATED APPLICATIONS

The present application is a continuation of U.S. patent application Ser. No. 13/312,791, filed Dec. 6, 2011, which is a continuation application of U.S. patent application Ser. No. 11/841,206, filed Aug. 20, 2007 (the '206 Application), which claims priority to U.S. Provisional Patent Application Ser. No. 60/823,047, filed Aug. 21, 2006; the '206 application is a continuation-in-part application of U.S. patent application Ser. No. 10/661,128, filed Sep. 12, 2003, (which claims priority to U.S. Provisional Application Ser. No. 60/502,179, filed Sep. 11, 2003), which is a continuation-in-part application of U.S. patent application Ser. No. 09/967,571, filed Sep. 28, 2001; and the '206 application is a continuation-in-part application of U.S. patent application Ser. No. 11/094,605, filed Mar. 30, 2005 (now U.S. Pat. No. 7,303,475, issued Dec. 4, 2007), which is a continuation application of U.S. patent application Ser. No. 09/967,571, filed Sep. 28, 2001, the entire specifications of all of which are expressly incorporated herein by reference.

FIELD OF THE INVENTION

The present invention relates generally to gaming machines, and more particularly, to a system and method for providing a player interface to a player of a gaming machine that includes a display device operably associated with a proximity button activation system.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

One area that has received a lot of attention in recent years has been providing added bonuses or incentives to players of electronic gaming machines, such as video slot machines video poker machines. An award may be selected at random or be based on a player's previous level of play. Once a player has met the selected criteria, the award in credits paid from the machine's hopper is released.

Players may also be given an incentive through a player tracking club. Usually, a player is identified during play by a player tracking ID card and/or a player identification number (PIN). The player tracking system tracks the player's play and awards player tracking points according to established criteria. The player tracking points may be redeemed for prizes, such as complimentary meals or merchandise.

Typically, the player track ID card is entered into a player ID card located on the electronic gaming machine. A separate, numeric key pad is used to enter the PIN. Furthermore, a separate display screen may be used to display information or instructions to the player.

However, standard systems are inflexible and do not provide the casino operator with the maximum benefit and advantages available from the information and systems now available.

Another problem is that the various components of the player tracking system, especially the display (e.g. touch screen) and/or input (e.g., keypads) components typically include a mechanical switch or push button that requires some sort of human interaction to operate. Traditionally, push buttons are made out of mechanical switches and/or multi-layer resistive touch pads that can deteriorate and become less dependable over time. This is because most of these switches require physical displacement and pressure which are susceptible to wear-out, contact bounce, corrosion and arcing. Another problem is the soiling of the display and input components, e.g., from drinks and/or food served in the gaming establishments, thus requiring frequent cleaning by the staff, player complaints about soiled gaming stations, and decreased utilization of the available gaming stations.

The present invention is aimed at one or more of the problems as set forth above.

SUMMARY OF THE INVENTION AND ADVANTAGES

In one aspect of the present invention, a player tracking device for providing a player interface to a player of a gaming machine is provided. The player tracking device is coupled to the gaming machine. The device includes a processor, an ID card reader, a display and a keypad. The ID Card reader is coupled to the processor. The display is coupled to the processor for displaying a bezel and information to the player. The keypad is coupled to the processor for receiving input from the player. The processor instructs the display to display instructions for inserting a player ID Card into the ID Card reader and for displaying cycling indicia or media.

In another aspect of the present invention, a device for providing an interface to a gaming machine for use by a user is provided. The player tracking device is coupled to the gaming machine. The device includes a processor, an ID card reader, a display, and a keypad.

In still another aspect of the present invention, a device for providing an interface to a gaming machine is provided. The device includes a processor, an ID Card reader coupled to the processor, a display coupled to the processor for displaying a bezel and information within the bezel. The device also including a keypad coupled to the processor for receiving input. The processor instructing the display to display media, instructions, and/or the like.

In still yet another aspect of the present invention, an alternative player tracking device for providing a player interface to a player of a gaming machine is provided. The alternative player tracking device is coupled to the gaming machine. The device includes a processor, an ID card reader, a touchless display and/or a touchless keypad. In this aspect, the player never has to physically contact the display and/or the keypad to input data, make gaming decisions, and/or the like. The touchless system employs electrical proximity sensing technology that is operable to detect when the player's finger enters an electrical field that corresponds to a specific input parameter (e.g., amount of wager, game selection, card selection, and/or the like), such as those typically assigned to various portions of a conventional display or keypad. The ID Card reader is coupled to the processor. The touchless display is coupled to the processor for displaying a bezel and information to the player. The touchless keypad is coupled to the processor for receiving input from the player. The processor instructs the display to display instructions for inserting a player ID Card into the ID Card reader and for displaying cycling indicia or media.

In accordance with one embodiment of the present invention, a player tracking device for providing a player interface to a player of a gaming machine is provided, the player tracking device coupled to the gaming machine, comprising: (1) a processor; (2) a player tracking device coupled to the processor; (3) a touchless display coupled to the processor for displaying information to the player; and (4) a touchless input interface coupled to the processor and being implemented by the touchless display for receiving input from a user for receiving input from the player, wherein either the touchless display or touchless input interface includes a resizing feature for permitting indicia on either the touchless display or touchless input interface to be increased in scale or size.

In accordance with a first alternative embodiment of the present invention, a player tracking device for providing a player interface to a player of a gaming machine is provided, the player tracking device coupled to the gaming machine, comprising: (1) a processor; (2) a player tracking device coupled to the processor; (3) a touchless display coupled to the processor for displaying information to the player; and (4) a touchless input interface coupled to the processor and being implemented by the touchless display for receiving input from a user for receiving input from the player, wherein either the touchless display or touchless input interface includes a sensor to detect the presence of the player.

In accordance with a second alternative embodiment of the present invention, a player tracking device for providing a player interface to a player of a gaming machine is provided, the player tracking device coupled to the gaming machine, comprising: (1) a processor; (2) a player tracking device coupled to the processor; (3) a touchless display coupled to the processor for displaying information to the player; and (4) a touchless input interface coupled to the processor and being implemented by the touchless display for receiving input from a user for receiving input from the player, wherein either the touchless display or touchless input interface provides tactile feedback to the player when a fingertip of the player is brought into proximity to either the touchless display or touchless input interface.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

I. Overview

With reference to the drawings and in operation, the present invention provides a system 10 and method 50, 52, 54, 56, 58 for providing a player interface to a player of a gaming machine 12. Gaming machines 12 may include, but are not limited to electronic gaming machines or EGM (such as video slot, video poker machines, or video arcade games), electric gaming machines, virtual gaming machines, e.g., for online gaming, and an interface to a table management system (not shown) for table games.

II. Gaming System

Figure 1:
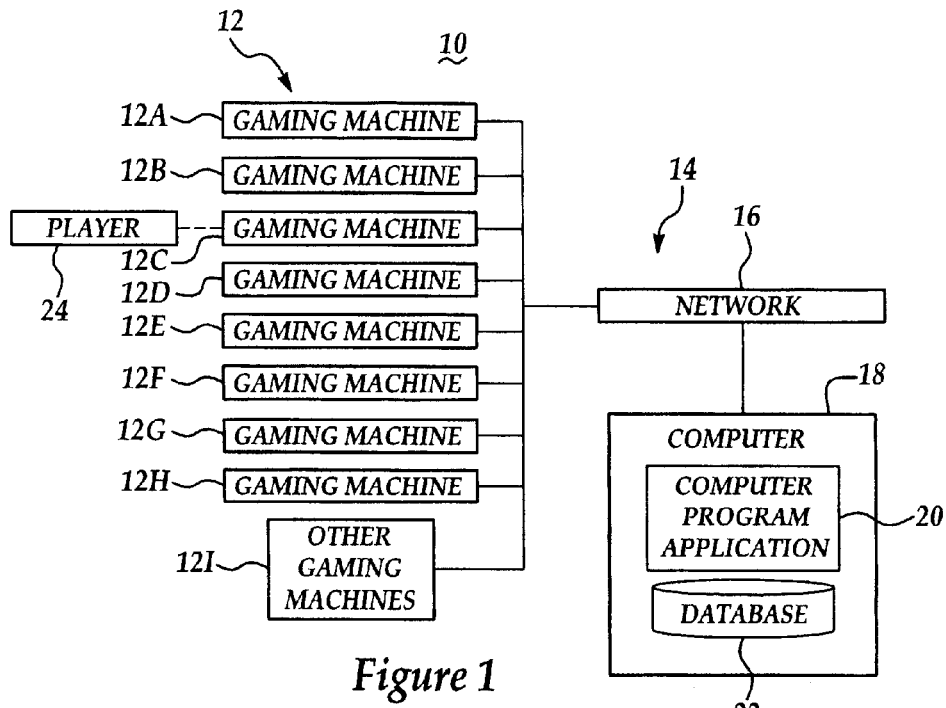
FIG. 1 is block diagram of a system for providing a player interface to a player of a gaming machine, according to an embodiment of the present invention.

In one embodiment, the system 10 and method 50, 52, 54, 56 may be embodied or implemented via an entertaining management and monitoring system 14 which is shown in block diagram form in FIG. 1. The entertainment and monitoring system 14 may include many additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT). Such systems are disclosed in U.S. patent application Ser. No. 09/967,571, filed Sep. 28, 2001 and U.S. Provisional Application Ser. No. 60/502,179, filed Sep. 11, 2003, both of which are hereby incorporated by reference.

As shown, the system 10 may include a plurality of gaming machines 12. In the illustrated embodiment, eight electronic gaming machines 12A-12H are shown. However, it should be noted that the present invention is not limited to any number or type of machines 12. In one embodiment, the machines 12 are organized into banks (not shown), each bank containing a plurality of machines 12. Other types of gaming machines which may be included (see above) are indicated with reference number 12I.

The gaming machines 12 are connected via a network 16 to one or more host computers 18, which are generally located at a remote or central location. The computer 18 includes a computer program application 20 which maintains one or more databases 22. In one embodiment, the database(s) are Oracle database(s).

The computer program application 20 and databases 22 may be used to record, track, and report accounting information regarding the gaming machines 12 and players of the gaming machines 12. Additionally, the computer program application 20 and databases 22 may be used to maintain information related to player tracking accounts (see below).

In general, the gaming machines 12 are playable by a player 24. The player 24 may select one of the gaming machines 12C to play and insert a coin, credit, coupon, and/or player tracking card (not shown) into the chosen gaming machine 12C. Generally, the gaming machines 12C have an associated number of credits or coins required in order to play. In the case of video slot or poker games, the game is played and an award in the form of credits may be awarded based on a pay table of the gaming machine 12.

Figure 2:
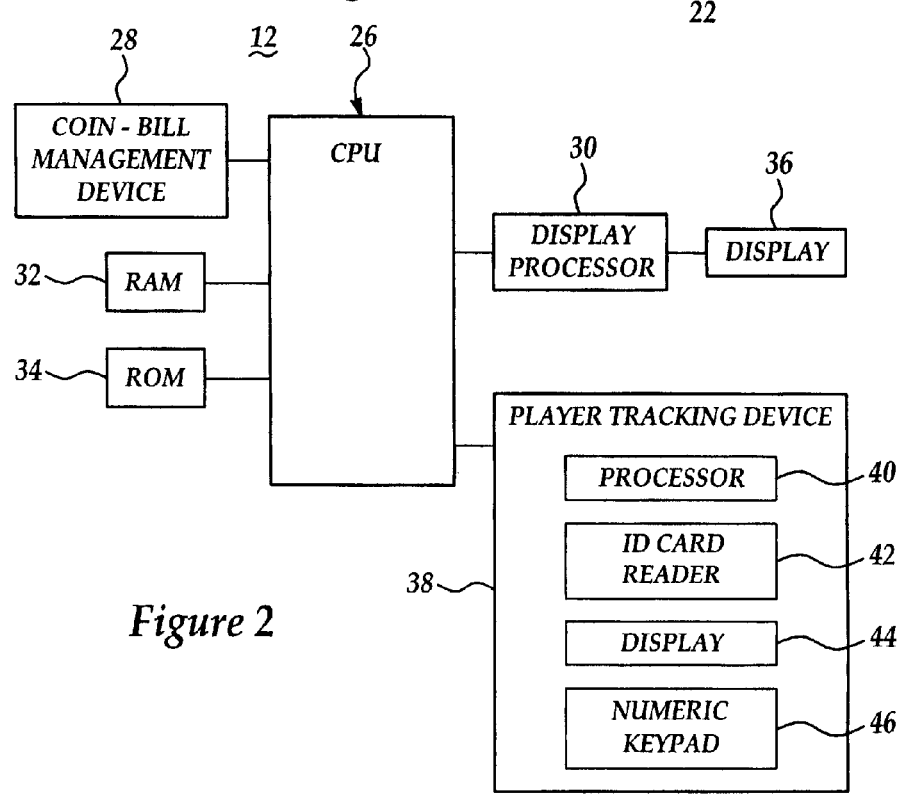
FIG. 2 is a block diagram of a gaming machine for use with the system of FIG. 1.

With reference to FIG. 2, a block diagram of a suitable electronic gaming machine 12C is shown.

The machine 12C comprises a game controller 26, or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the machine 12C, such as the booting operation thereof, game code and graphics.

Input to the gaming device 12C may be accomplished via mechanical switches or buttons or via a touchscreen interface (not shown). Such gaming machines 12 are well known in the art and are therefore not further discussed.

The player 24 is identified via the player tracking card and/or a player identification number entered into player tracking device 38 at each gaming machine 12 (see below). Player tracking accounts may be used, generally, to provide bonuses to a player, in addition to the award designated by, in the case of a video slot or poker machine, the gaming machine's 12 paytable. These bonuses may be awarded to the player 24 based a set of criteria, including, but not limited to, a) the player's play on the machine 12C, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game 12. Bonuses may also be awarded in a discretionary manner or based on other criteria, such as, purchases made at a gift shop or other affiliated location.

In one embodiment, the player tracking device 38 includes a processor 40, a player identification card reader 42 and/or a numeric keypad 44, and a display 46. In one embodiment, the display 46 is a touchscreen panel and the numeric keypad 44 is implemented thereon.

The player 24 may be identified by entry of a player tracking card into the player identification card reader 42 and/or entry of a player identification number (PIN) on the numeric key pad 46. The play tracking device 38 may also be used to communicate information between the computer 18 and the corresponding gaming machine 12C. The player tracking device 40 may also be used to track bonus points, i.e., incentive points or credits, downloaded from the computer 18.

III. Player Incentives—Bonus Points

In one aspect of the present invention, the bonuses are awarded as bonus points. In one embodiment, the bonus points are incentive points. In another embodiment, the bonus points are credits.

The incentive points may be converted to credits using a predetermined ratio. The predetermined ratio may be 1 or any other desired ratio. The predetermined ratio may also be varied based on determined criteria, e.g., the gaming machine 12 being played, the player, or the time of day. Incentive points may be designated as cashable or non-cashable. As described below, the incentive points in a player account may be downloaded to one of the gaming machines 12 for play.

Incentive points stored in the player account may be designated as cashable or non-cashable. In one embodiment, the player account may include only cashable incentive points. In another embodiment, the player account may include only non-cashable incentive points. In a third embodiment, the player account may include both cashable and non-cashable incentive points.

In still another embodiment, the player account may include incentive points, cashable and/or non-cashable, and credits, cashable and/or non-cashable.

Cashable credits, or incentive points converted into credits, may be downloaded to a gaming machine 12. When the player has finished playing the gaming machine 12, any remaining credits may be cashed out, i.e., retrieved as coins or placed on a printed ticket or player tracking card for redemption or play on another gaming machine 12.

Non-cashable credits must be played. When the player stops playing gaming machine 12C, any remaining non-cashable credits which were downloaded to the gaming machine 12C are either lost or uploaded back to the player account (see below).

The database 22 tracks the player account for each player in the player tracking system. In the illustrated example, the following is tracked for each player: account number, incentive points, name, cashable credits and non-cashable credits. Thus in this example, bonus points in the form of incentive points, cashable credits and non-cashable credits may be awarded.

In one aspect of the present invention, bonus points are awarded via electronic vouchers, i.e., records in the database 22. A voucher is created each time bonus points are awarded. Each voucher has a voucher number and an amount (in the case a dollar or credit amount). Each voucher is assigned to a player account and includes the player account number to which it is assigned. Each voucher may include additional parameters or fields based on the needs of the system 10. For example, an expiration date could be included which gives a date at which the respective voucher expires. The voucher may also designate the bonus points as cashable or non-cashable.

In one aspect of the present invention the computer 18 may create a first voucher and assign a first number of bonus points to the first voucher. The computer 18 may also create a second voucher and assign a second number of bonus points to the second voucher. The first and second vouchers may be assigned to a player account. Each voucher has a parameter. The parameter of the first voucher has a first value and the parameter of the second voucher has a second value.

In one embodiment, the bonus points are incentive points which may be converted to credits and downloaded to the gaming machine 12C.

In another embodiment, the bonus points are credits which may be downloaded to the gaming machine 12C.

In one embodiment, the gaming machine 12C may display to the player 24 a list of the vouchers which have been assigned to their player account. The player 24 may then indicate at least one voucher to download. The list may displayed whenever appropriate, for example, when the player 24 is identified to the system 10, when the player requests the list (through a menu system), when a new voucher has been created, or any other suitable time. In one embodiment, the list may be displayed on the display 36. In another embodiment, the list may be displayed on the player tracking device display 44.

The first and second values of the parameters of the first and second vouchers 48 may be equal or different. For example, in one embodiment the parameter relates to an expiration date of the respective voucher. The expiration date may be a function of the date of the voucher was created. Thus, the expiration dates of the first and second vouchers may be different if the vouchers were created on different days or may be the same if created on the same day.

In another embodiment, the parameter is one of cashable and non-cashable. The computer 18 may designed a voucher as cashable or non-cashable. Typically, this is defined by predefined criteria based on how the voucher was created.

If the bonus points for a specific voucher are incentive points, the incentive points may be converted to credits prior to downloading to the gamine machine 12C. As described above, this is done using a predetermined ration which may be 1 or some other ratio.

In one embodiment, the gaming machine 12 may provide an indication to the player 24 when the first voucher or second voucher has been assigned to the player account. For example, the indication may be an audio signal and/or a visual signal.

In one embodiment, the parameter may be an expiration date of the respective voucher. Each voucher may also include a second parameter designating the respective bonus points as being cashable or non-cashable.

In one embodiment, the computer 18 may convert the first number of bonus points to a first number of credits and download the first number of credits to the player tracking device 38.

In another embodiment, the gaming machine 12 has a credit meter for tracking available credits for play of the gaming machine by the player 24. The computer 18 may convert the first number of bonus points to a first number of credits and download the first number of credits to the credit meter.

In one embodiment, the parameter may be one lump-sum and pay for play. The computer 18 may convert the first number of bonus points to credits and download the credits to the credit meter if the first voucher is designated as lump-sum.

In one embodiment of the present invention, the gaming machine 12 is capable of accepting a variable wager. The variable wager has a maximum wager value or MAX BET. In one embodiment, the maximum wager value is equal to the lesser of a value defined by the configuration of the gaming machine 12, a value defined by the incentive setup, or the remaining balance of bonus points. The computer 18 converts the first number of bonus points associated with the first voucher to a first number of credits and downloads the first number of bonus points to the player tracking device 38 as credits. The gaming machine 12C allows the player 24 to place a wager and play the gaming machine 12C. The gaming machine 12C decrements the wager from the credit meter, decrements the maximum wager from the player tracking device 38, and credits the maximum wager to the credit meter in response to the player 24 playing the gaming machine 12C.

In another embodiment of the present invention, the player account is credited with a first number of bonus points. The bonus points are downloaded to the player tracking device 38 as credits. The player 24 places a wager and the gaming machine 12 is played. If the total of the player's wagers (over one or more games) is greater or equal to a predetermined value, i.e., a predetermined match play amount, then the match play amount is decremented from the player tracking device 38 and the match play amount is credited to the credit meter. Otherwise, the player 24 may place another wager.

One suitable system for crediting a player with bonus points is described in U.S. patent application Ser. No. 10/661,392, filed concurrently with the present application, which is hereby incorporated by reference.

IV. The Player Tracking Device Interface

With reference to FIG. 2, in one aspect of the present invention, the player tracking device 38 provides an interface for interaction between the player 24 or other user (not shown), such as a slot employee or slot technician, and the host computer 18, i.e., player tracking system. As discussed above in one embodiment, the display 44 is a touchscreen display which allows information to be displayed to the player 24 or user, as well as provide interactive buttons or menus for receiving input. Furthermore, the keypad 46 may be implemented on the display 46 and displayed on the display 44 as appropriate or required.

In one aspect of the present invention, the display 44 displays a bezel 50. Other information may be displayed within the bezel 50.

In one embodiment, the bezel 50 includes a modifiable parameter for indicating information, e.g., to a slot employee. The modifiable parameter may be color, but other parameters may be used. For example, the bezel may blink, change colors, or cycle in some other manner to convey information.

In one embodiment, the modifiable parameter may be one of (at least) first and second values which are indicative of predetermined criteria of the player 24. For example, the first value (such as the color red) may be indicative of a hot player and the second value (such as the color blue) may be indicative of a mild player.

If the game machine 12C is not currently being played, the processor 40 may instruct the display 44 to display instructions for inserting a player ID Card into the ID card reader 42. Additionally, the display may other media, e.g., audio and/or video and/or pictures, in a cyclical manner.

The types of media that may be displayed on the player tracking device 38 include, but are not limited to local attractions, general in-house advertisements, paid advertisements by local merchants, show reviews, promotional alerts, security alerts, community service advisories, emergency directions, featured videos, a current Keno board.

Figure 3A:
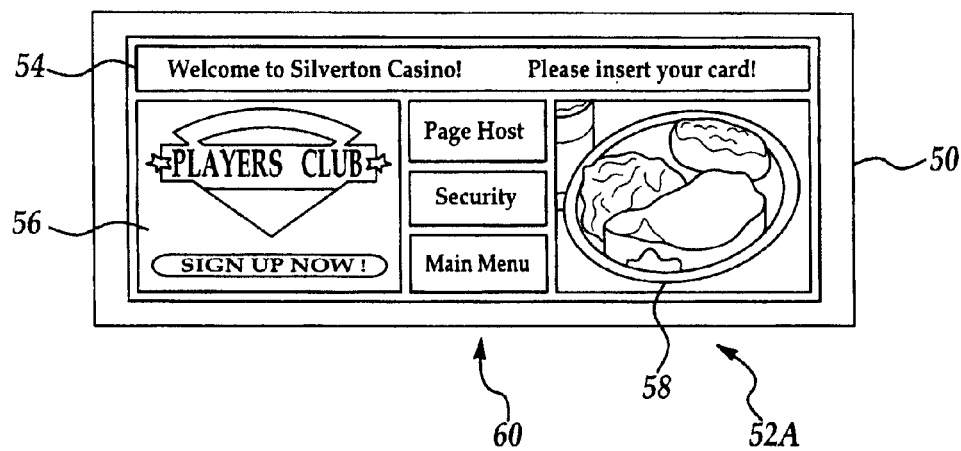
FIG. 3A is a diagrammatic illustration of an interface, according to an embodiment of the present invention.

With specific reference to FIG. 3A, a first sample screen image 52A is shown. The screen image 52A is shown within the bezel 50 and includes a title bar 54 with instructions to "insert your card", a player's club welcome image 56, an advertising media 58, and a plurality of buttons 60.

The player's club welcome image 56 may be player selectable which may cause the player tracking device 38 to display a screen or series of screens for allowing the player to enroll in the player tracking system. Alternatively, selection of the player's club welcome image may page a host (not shown) who could enroll the player in the player tracking club. The host may be enroll the player using a remote device (not shown).

The advertising media 58 may include an image and/or (live or streaming) video and/or audio media.

Figure 3B:
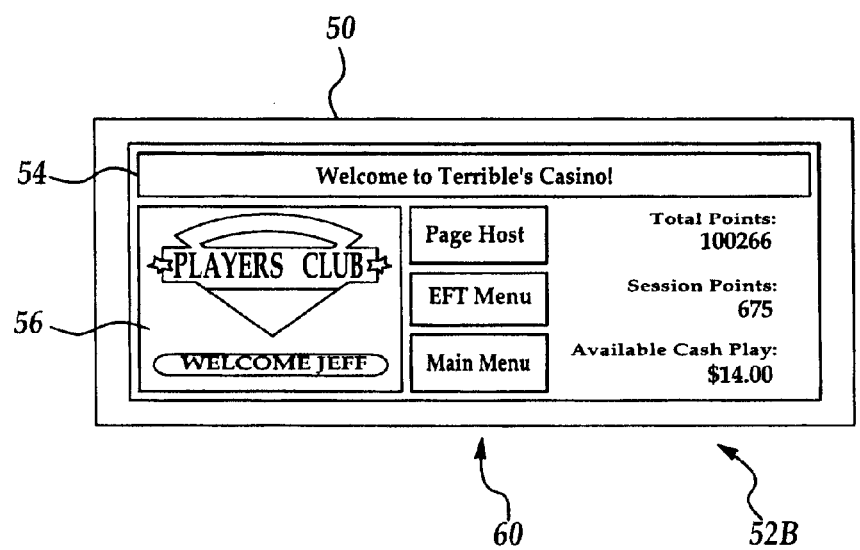
FIG. 3B is a diagrammatic illustration of an interface, according to an embodiment of the present invention.

The buttons 60 allow the player 24 to interact with the host computer 18. For example as shown in FIGS. 3A and 3B, buttons may be provided which allow the player 24 to page a host (a slot host or a drink hostess), page security (or security employee), or to navigate to a main menu (not shown).

In another aspect of the present invention, the player tracking device 38 allows the player 24 to interact with the player tracking system to view information and to interact with the player's account. For example with specific reference to FIG. 3B, once the player 24 has been identified to the player tracking system, the display may a bonus point total, a session bonus point total, and an available cash play.

Furthermore, as discussed above, the player tracking device 38 may display a list of vouchers assigned to the player 24. The player 24 may be allowed to select a voucher to download.

In another aspect of the present invention, the player tracking device 38 allows the player 24 to send and receive messages to a spouse, friend, or slot employee. The messages may be text and/or video and/or audio messages.

In another aspect of the present invention, the player tracking device 38 allows the player 24 to conference call a spouse, friend, or slot employee. The conference call may be text and/or video and/or audio messages.

In another embodiment, the, the media containing a machine glossary of terms.

In still another embodiment, the media may include a live video feed from a selected security camera.

Figure 3C:
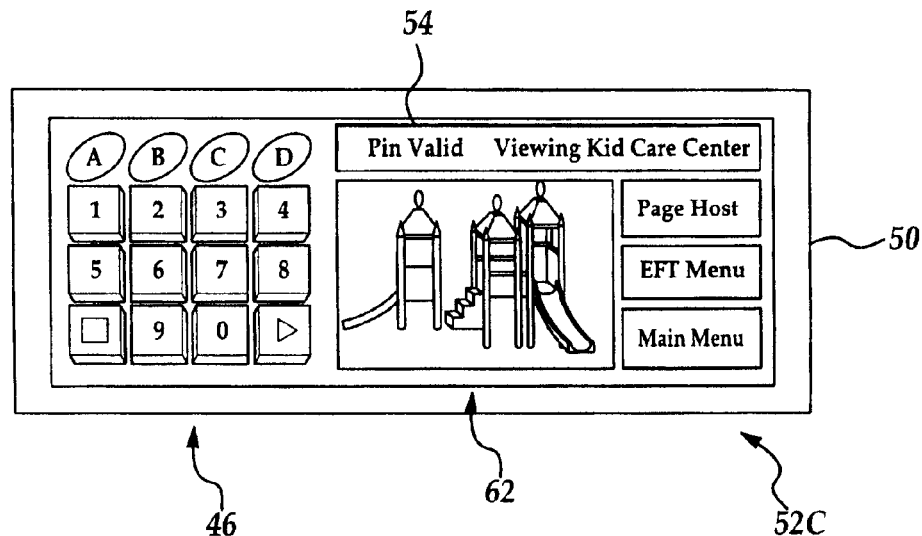
FIG. 3C is a diagrammatic illustration of an interface, according to an embodiment of the present invention.

With specific reference to FIG. 3C, in still another embodiment, the player tracking device 38 may provide a live video feed 62 of a remote location (not shown). For example, the remote location may be a childcare facility at which a child of the player 24 may be enrolled. In one embodiment, the player tracking device 38 for confirms that a child of the player 24 is enrolled at the child care facility through a personal identification number (PIN). If the PIN entered on the numeric or alpha-numeric keypad 46 is valid, the live feed 62 is displayed.

Figure 3D:
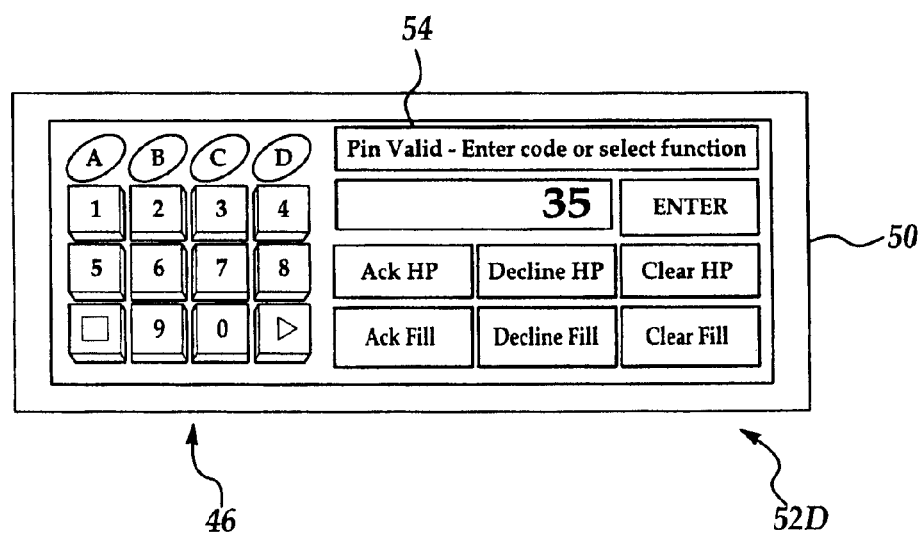
FIG. 3D is a diagrammatic illustration of an interface, according to an embodiment of the present invention.

With reference to FIG. 3D, in a further aspect of the present invention, the player tracking device 38 may alert a technician in response to an error condition of the gaming machine 12. The player tracking device identifies the technician by an ID card inserted into the ID card reader and/or an identification number entered on the keypad 46. In one embodiment, the tracking device 38 may display technical instructions, e.g., repair instructions, or debugging information to the slot technician. The technical instructions or debugging information may be in the form of text, video, and/or audio.

In another embodiment, the keypad 46 may be used for entering repair or verification codes by user. With specific reference to FIG. 3D, the keypad 46 may be used to enter verification codes related to hopper fills or jackpot fills.

In one embodiment, the verification codes relate to the gaming machine 12 which is coupled to the player tracking device 38 on which the code is entered. In another embodiment, a verification code may be related to another of the gaming machines 12.

V. The Alternative Player Tracking Device Interface

Figure 4:
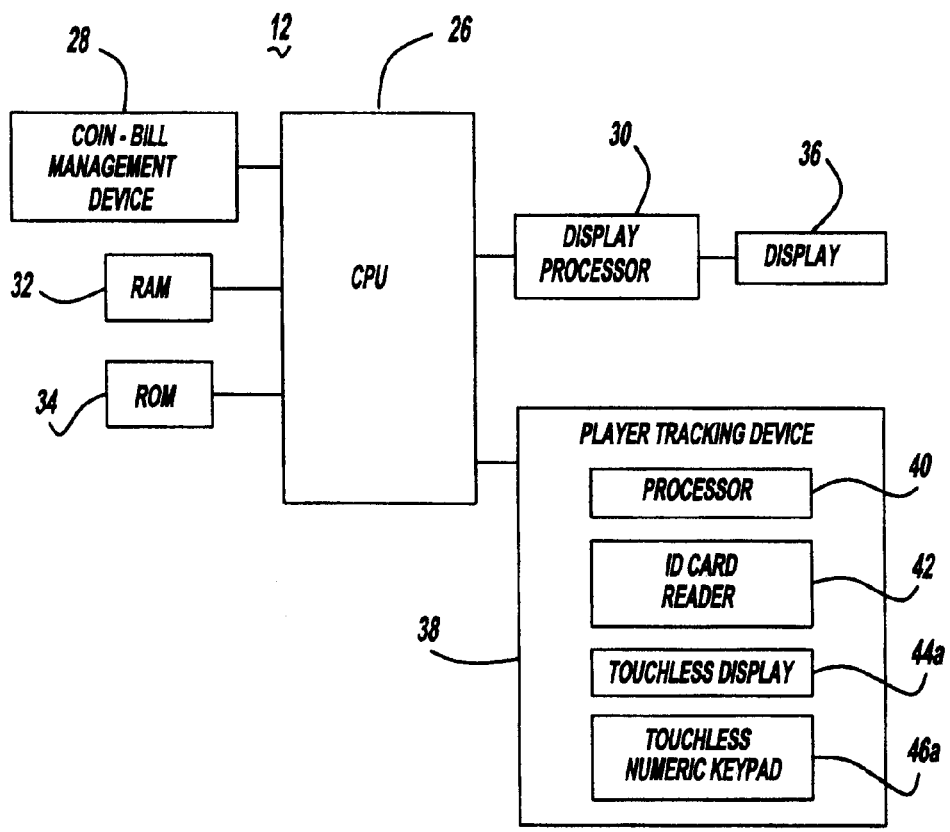
FIG. 4 is a block diagram of an alternative gaming machine for use with the system of FIG. 1.

With reference to FIG. 4, in one aspect of the present invention, an alternative player tracking device 38a provides an interface for interaction between the player 24 or other user (not shown), such as a slot employee or slot technician, and the host computer 18, i.e., player tracking system. As will be discussed herein, the touchless display 44a is a screen display which allows information to be displayed to the player 24 or user, as well as provide interactive buttons or menus for receiving input. Furthermore, the touchless keypad 46a may be implemented on the touchless display 44a and displayed on the touchless display 44a as appropriate or required. That is, neither the touchless display 44a or touchless keypad 46a require the player 24 or user to physically contact the touchless display 44a or touchless keypad 46a to interface with the alternative player tracking device 38a. More specifically, the alternative player tracking device 38a relies on proximity sensing to determine whether a finger (or other body part) of the player 24 or user has entered an electric field established by one or more electrodes operably associated with one or more input parameters (e.g., amount of wager, game selection, card selection, and/or the like), such as those typically assigned to various portions of a conventional display or keypad. It should be appreciated that the touchless display 44a or touchless keypad 46a can also include an alphanumeric keyboard incorporated therewith or thereon, e.g., for allowing input to be received from the Player 24 or other user, e.g., PIN numbers, e-mailing, text messaging, entering specific wager amounts, and/or the like.

Such a proximity sensing system is available from Freescale Semiconductor, Inc. (Chandler, Ariz.) and marketed as electric field imaging devices under models MC34940 and MC33794. These devices offer an alternative to mechanical push buttons for control panel applications. The MC34940/MC33794 integrated circuits (IC) contain the circuitry necessary to generate a low level electric field and measure the field loading caused by objects (e.g., fingers or fingertips) moving into or out of the field. They are suitable for applications that desire non-contact sensing, proximity detection, and three-dimensional e-field imaging. In one aspect, the ICs integrate support for a microcontroller and 7 to 9 electrodes, which can be used independently to determine the size or location of an object in a weak electric field.

With the MC34940/MC33794, membrane switches and resistive touch pads can be replaced with an array of touchless pads consisting of conductive electrodes embedded beneath an insulating surface. Because it has the capability of sensing both touch and proximity through the insulating surface, without direct electrical contact with the electrode metal, problems of wear, contamination, and corrosion are eliminated. This capability is also important for sophisticated touch control applications, including a user interface panel that is sensitive to different degrees of proximity, thus enabling the system to go from standby to active mode as a finger approaches the panel.

Further, one of the MC34940/MC33794 key features that surpass simple capacitive based sensors is its on-board shield driver. Touchless pads do not have to be combined and located at one centralized location. With proper shielding, coaxial cables or printed circuit board (PCB) layers can be used to connect remote touchless pads up to a few yards away, while obtaining measurements as accurately as if the touchless pads were directly connected to the IC. The MC34940/MC33794 does this by driving a signal on the shield of the coax or a PCB trace which closely follows the signal conductor voltage. The current which flows through the electric field between two conductors is proportional to the voltage difference between them. With little or no voltage difference between them, there is little or no current flow between the electrode conductor and the shielding trace or coax shield.

The MC34940/MC33794 electric field is derived by the oscillator circuitry within the IC which generates a high purity, low frequency, 5 V peak-to-peak sine wave. This frequency is tunable by an external resistor and is optimized for 120 kHz. This AC signal is fed through an internal 22 kΩ resistor, to a multiplexer which directs the signal to the selected electrode or reference pin or to an internal measurement node. Unselected electrodes are automatically connected to the circuit ground by the IC.

These deselected electrodes can act as the return path needed to create the electric field current, because in order to create current flow, the current must follow a complete path, i.e., out of the electrode pin and back to the common ground of the IC GND pin. Thus, an electric field will cause a current to flow between the active electrode and any object with an electrical path to the IC ground, including deselected electrodes.

The current flowing between the electrode and its surrounding grounds will result in a voltage drop across the internal resistance. This, in turn, results in a voltage change at the pin. An on-board detector in the IC converts the AC signal to DC level. The DC level is then low-pass filtered using an internal series resistor and an external parallel capacitor. This DC voltage is multiplied, offset and sent to the LEVEL pin of the IC.

The MC34940/MC33794 can detect anything that is either conductive or has different dielectric properties than the electrodes' surroundings. Human beings are well suited for e-field imaging. This is because the human body is composed mainly of water that has a high dielectric constant and contains ionic matter which gives it good conductivity. The body also provides good electrical coupling to earth ground which can be connected to the ground return of the IC. Thus, when a finger is brought close to a metal electrode, an electrical path is formed, producing a change in electric field current that is detected by the MC34940/MC33794 and translated to a different output voltage.

To understand how electrode designs affect the IC's capabilities, it is important to understand the basic definition of a capacitor. A common capacitor uses an electric field and an insulating dielectric to allow current conduction to occur. It can be made by placing two metal plates in parallel with each other. If the plates are separated by a distance "d" with each plate having an area of "A," the capacitance of the capacitor can be calculated using the formula: $C=(kA_\in)/d$ where C is the capacitance of the capacitor in Farads, A is the area of the plates in meter$^2$, d is the distance between the plates in meters, k is the dielectric constant of the material between the plates, c is the permittivity ($8.85\times10^{12}$ F/m).

From the above equation, it can be seen that area (A), distance/spacing (d), and the dielectric constant (k) are the three factors that affect the magnitude of the capacitance. At a given frequency and voltage of an applied signal, the capacitance controls the resulting electric field current flow. The output of the MC34940/MC33794 responds to variations in this current.

An electrode can be anything that is electrically conductive. When designing the electrodes for any application, one must take into account the physical size of the conductive electrode. The larger the electrode, the more range and sensitivity will be obtained. However, as the electrode size is increased, so is its susceptibility to interference, electrical noise, and "stray" electric-field paths in its surroundings. One of the key practices regarding electrode design is for the electrode's area to correspond the surface area of the object being detected. Touchless pads for touchless panel applications, for example, would only require a size that suits the surface area of a finger. This limits its usable size. Therefore, the distance or spacing factor will play a significant role on how the electrode should be laid out. Another factor which needs to be considered is how the fringing between the patterns adds to electric field current.

Some of the electric field current will flow in the fringing field between a pair of electrodes. If the ratio of the fringing field path to the direct path is held constant, the height of the fringing field relative to the plane of the electrodes increases in direct proportion with the spacing. This fringing field allows an ungrounded object to be sensed in the "third" dimension above the essentially two dimensional array of electrodes, and the relative sensitivity for a given height above the plane of the electrodes increases with electrode spacing. It is important to note that the total current flow decreases with increased spacing. The point of this is that there is interaction between electrode size and spacing and their ability to sense objects in the third dimension. In the case of a grounded object, the fringing field will not play as much of a role since some of the current will flow directly to the grounded object from the electrode, but good electrode design should keep both of these effects in mind.

Additionally, the electrodes can be provided with multi-layer technology such as but not limited to various layers, either in front or behind, to serve various purposes, such as but not limited to protection of the electrodes and/or screen display systems, increased resolution/conductivity of the electrodes, increased communication between the electrodes and any signal processing systems, and/or the like.

The MC34940/MC33794 works best when the total capacitance between an electrode and ground or another electrode close to 50 pF, when the finger is in the "activate" range. The total system capacitance should be below 75 pF and preferably below 65 pF for best sensitivity. This includes the IC pin, PWB trace, wire, and any other stray capacitance. Large electrodes should be used when distances are great, and small electrodes when distances are small.

The placement of ground is important. As mentioned earlier, electric field currents can exist between the active electrode and any grounded object. By intertwining the electrode with ground, the essential ground source needed to create an e-field is directly accessible to the electrode. This path is less variable than the path through a body and earth and provides a more predictable and less noisy path.

Electrically conductive electrodes can be attached directly to the MC34940/MC33794 electrode pins via wire or coax cable. The IC SHIELD pin allows coaxial cable to be used without reducing sensitivity or adding variations due to changes in the coax capacitance. The signal from the SHIELD pin is a buffered version of the signal driving the selected electrode. It has the same amplitude and phase. This reduces amplitude of the electric field between the center conductor and the shield of the coax to nearly 0. This results in nearly zero field current between them and doesn't add to the field current at the electrodes.

The electrodes of a touchless pad can be formed directly on PCB using copper circuit traces. The field current of the wires used to connect the IC pins to the electrodes was reduced by placing a copper layer connected to the shield pin over the signal traces. This practice also hides the exposed wires from the plate to be contacted by the user. This prevents false indications of a touch when a finger touches an area above the routing traces.

Further, an electric current could flow in the field created from the touchless pad to an object above or below it. Because we want the field to only propagate on top of the touchless pads, we eliminated the effective capacitance on the back side of the touchless pad by placing a conductive layer under all of the touchless pads and connected it to the shield driver pin of the IC.

When touchless pads are close together, it is possible that a finger could be over more than one touchless pad at a time. In this case, the analog levels from the IC can be used to determine which of the electrodes has more coverage. In a column-row configuration, for example, when a finger with its surface area distributed between buttons A and B, one particular electrode will attain a great amount of loading, while adjacent or proximate electrodes will also detect some difference in measurements. Software can determine which of the electrodes will have a higher amount of loading difference. The higher reading of the adjacent or proximate electrodes, when combined with the one particular electrode would then be chosen to perform whatever particular task was intended.

Additionally, the touchless display 44a or touchless keypad 46a can provide tactile feedback to the user such that the player 24 or other user can feel or sense that his/her finger is in proximity to and/or activating (or about to activate) a particular portion of the touchless display 44a or touchless keypad 46a. The tactile feedback can take many forms, including but not limited to inducing a sensation (e.g., vibration, tingling, and/or the like) in the Player 24 or other user's finger when his/her finger is in proximity to and/or activating (or about to activate) a particular portion of the touchless display 44a or touchless keypad 46a. In this manner, the player 24 or other user can be confident that they are pointing to the desired portions of the touchless display 44a or touchless keypad 46a that are to be chosen or activated (e.g., when selecting a game, placing a wager, requesting casino services and/or the like).

Furthermore, the touchless display 44a or touchless keypad 46a can provide a "resizing" or "zooming" feature for those individuals who have poor eyesight or who might be confused because the display is too crowded for them to clearly discern all of the information presented thereon. Although this feature is primarily intended to be used in connection with non-input areas of the touchless display 44a or touchless keypad 46a (e.g., those areas that are informational only (e.g., indicia or media such as but not limited to game rules, game instructions, and/or the like), as opposed to input areas (e.g., selecting a game, placing a wager, requesting casino services and/or the like)), this feature can also be used in connection with input areas as well. By way of a non-limiting example, when a Player 24 or other user placing his/her finger over a particular area of the touchless display 44a or touchless keypad 46a, that particular portion will be displayed on the screen or keypad in either large size print and/or in detail view so that it can be easily read or seen by the Player 24 or other user.

Also, the touchless display 44a or touchless keypad 46a can be provided with a sensing system (e.g., such as the one described above) that, when detecting the presence of person passing near the gaming machine (as opposed to sensing the proximity of a fingertip), can activate a system to attract the person's attention, e.g., by displaying lights, sounds, videos, animations, and/or other effects. In this manner, the person's interest will be peaked, and they will be drawn over to the gaming machine.

In one aspect of the present invention, the touchless display 44a displays a bezel 50. Other information may be displayed within the bezel 50.

In one embodiment, the bezel 50 includes a modifiable parameter for indicating information, e.g., to a slot employee. The modifiable parameter may be color, but other parameters may be used. For example, the bezel may blink, change colors, or cycle in some other manner to convey information.

In one embodiment, the modifiable parameter may be one of (at least) first and second values which are indicative of predetermined criteria of the player 24. For example, the first value (such as the color red) may be indicative of a hot player and the second value (such as the color blue) may be indicative of a mild player.

If the game machine 12C is not currently being played, the processor 40 may instruct the touchless display 44a to display instructions for inserting a player ID Card into the ID card reader 42. Additionally, the display may other media, e.g., audio and/or video and/or pictures, in a cyclical manner. Furthermore, the touchless display 44a (or any player interface/input system such as but not limited to the touchless numeric keypad 46a) can be configured in any size and/or shape desired or required by any particular application. By way of a non-limiting example, the touchless display 44a can be configured in a 4 inch by 4 inch grid and/or the like.

The types of media that may be displayed on the player tracking device 38a include, but are not limited to local attractions, general in-house advertisements, paid advertisements by local merchants, show reviews, promotional alerts, security alerts, community service advisories, emergency directions, featured videos, a current Keno board.

Figure 5A:
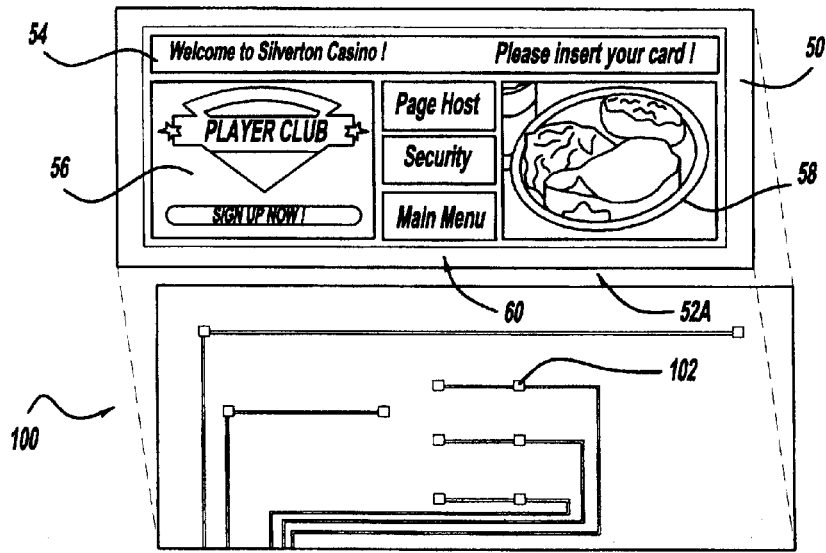
FIG. 5A is a diagrammatic illustration of an alternative interface, according to an embodiment of the present invention.

With specific reference to FIG. 5A, a first sample screen image 52A is shown. The screen image 52A is shown within the bezel 50 and includes a title bar 54 with instructions to "insert your card," a player's club welcome image 56, an advertising media 58, and a plurality of buttons 60. The proximity sensing system 100 is located directly or indirectly behind the buttons 60 and includes a plurality of electrode assemblies 102 corresponding to the locations of the respective buttons 60. The proximity sensing system 100 is operably associated with the alternative player tracking device 38a, e.g., via wires, cables, servers, routers, controllers, and/or the like. Accordingly, if a player 24 or user wishes to activate a particular button, he or she merely has to place their fingertip near, but not touch, the area directly above the button. The electrode assembly 102 senses the presence of the fingertip, as previously described, and an electronic signal is generated that informs the alternative player tracking device 38a that the particular button has been activated.

The player's club welcome image 56 may be player selectable which may cause the alternative player tracking device 38a to display a screen or series of screens for allowing the player to enroll in the player tracking system. Alternatively, selection of the player's club welcome image may page a host (not shown) who could enroll the player in the player tracking club. The host may enroll the player using a remote device (not shown).

The advertising media 58 may include an image and/or (live or streaming) video and/or audio media.

Figure 5B:
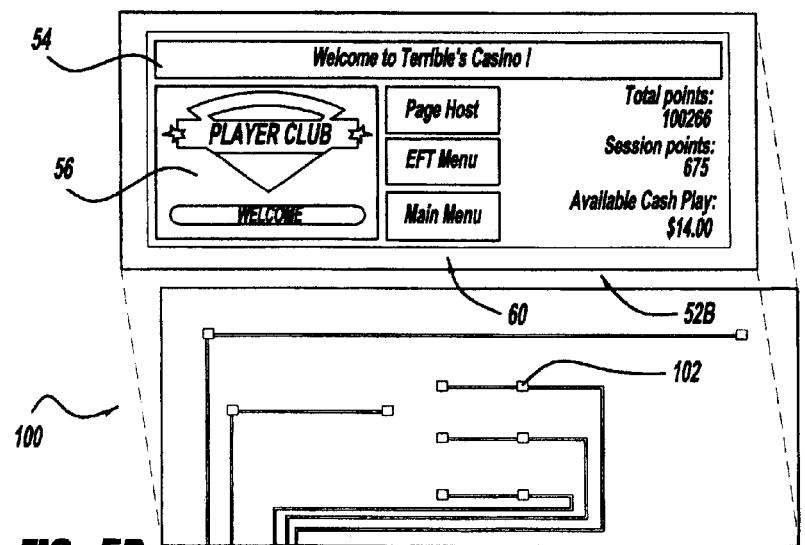
FIG. 5B is a diagrammatic illustration of an alternative interface, according to an embodiment of the present invention.

The buttons 60 allow the player 24 to interact with the host computer 18. For example as shown in FIGS. 5A and 5B, buttons may be provided which allow the player 24 to page a host (a slot host or a drink hostess), page security (or security employee), or to navigate to a main menu (not shown). Again, the buttons would be of the touchless variety, as previously described.

In another aspect of the present invention, the alternative player tracking device 38a allows the player 24 to interact with the player tracking system 38a to view information and to interact with the player's account. For example, with specific reference to FIG. 5B, once the player 24 has been identified to the player tracking system 38a, the display may indicate a bonus point total, a session bonus point total, and an available cash play.

Furthermore, as discussed above, the alternative player tracking device 38*a* may display a list of vouchers assigned to the player 24. The player 24 may be allowed to select a voucher to download, again via interaction with the touchless keypad.

In another aspect of the present invention, the alternative player tracking device 38*a* allows the player 24 to send and receive messages to a spouse, friend, or slot employee. The messages may be text and/or video and/or audio messages.

In another aspect of the present invention, the alternative player tracking device 38*a* allows the player 24 to conference call a spouse, friend, or slot employee. The conference call may be text and/or video and/or audio messages.

In another embodiment, the, the media contains a machine glossary of terms.

In still another embodiment, the media may include a live video feed from a selected security camera.

Figure 5C:
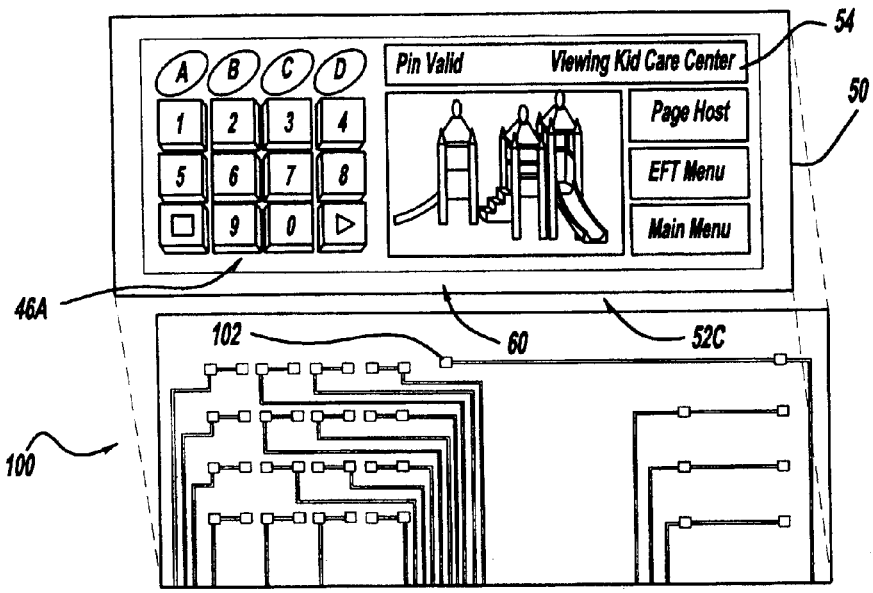
FIG. 5C is a diagrammatic illustration of an alternative interface, according to an embodiment of the present invention.

With specific reference to FIG. 5C, in still another embodiment, the alternative player tracking device 38*a* may provide a live video feed 62 of a remote location (not shown). For example, the remote location may be a childcare facility at which a child of the player 24 may be enrolled. In one embodiment, the alternative player tracking device 38*a* for confirms that a child of the player 24 is enrolled at the child care facility through a personal identification number (PIN). If the PIN entered on the numeric or touchless alpha-numeric keypad 46*a* is valid, the live feed 62 is displayed.

Figure 5D:
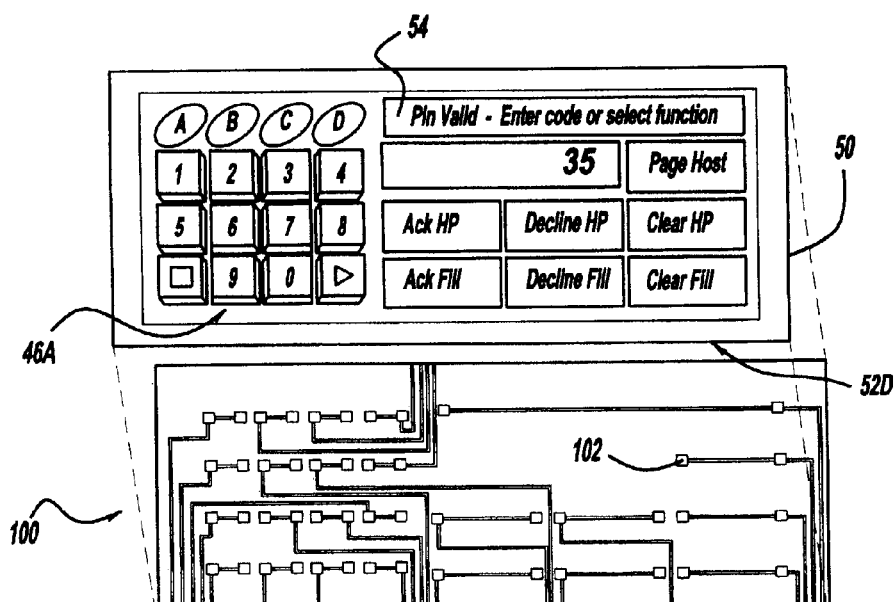
FIG. 5D is a diagrammatic illustration of an alternative interface, according to an embodiment of the present invention.

With reference to FIG. 5D, in a further aspect of the present invention, the alternative player tracking device 38*a* may alert a technician in response to an error condition of the gaming machine 12. The alternative player tracking device 38*a* identifies the technician by an ID card inserted into the ID card reader and/or an identification number entered on the touchless keypad 46*a*. In one embodiment, the alternative tracking device 38*a* may display technical instructions, e.g., repair instructions, or debugging information to the slot technician. The technical instructions or debugging information may be in the form of text, video, and/or audio.

In another embodiment, the touchless keypad 46*a* may be used for entering repair or verification codes by user. With specific reference to FIG. 5D, the touchless keypad 46*a* may be used to enter verification codes related to hopper fills or jackpot fills.

In one embodiment, the verification codes relate to the gaming machine 12 which is coupled to the alternative player tracking device 38*a* on which the code is entered. In another embodiment, a verification code may be related to another of the gaming machines 12.

It should also be appreciated that the proximity sensing system of the present invention can be used with other components of the gaming machine or system other than the player tracking device. By way of a non-limiting example, the proximity sensing system of the present invention can be used with other display and/or input components of the gaming machine itself, such as but not limited to the main display screen, auxiliary display screens, key pads (including any devices operable for inputting information or data), other peripheral devices, and/or the like. In this manner, other portions of the gaming machine can be provided with the benefits of proximity sensing system of the present invention, regardless of whether a player tracking system is associated therewith.

Additionally, the proximity sensing system 100 can be configured so as to be operable to adapt and/or modify the player interface, such as but not limited to the player tracking device 38*a*, touchless display screen 44*a*, and/or the touchless keypad 46*a*, based on proximity of the player 24 to the gaming machine or any components thereof, including but not limited to the player tracking device 38*a*, touchless display screen 44*a*, and/or the touchless keypad 46*a*. By way of a non-limiting example, visual, aural and/or the like effects can be implemented in response to the proximity of the player 24. For example, the player interface, e.g., via the proximity sensing system 100, can be configured such that when a player 24 makes a selection or input, the touchless display screen 44*a* and/or the touchless keypad 46*a* "clicks" or "indents" alerting the player 24 that a particular selection or input has occurred. Another example would be providing some indicia (e.g., either visually or aurally) that the player 24 has selected and/or inputted (or is about to select or input) a particular selection or input, such as by highlighting, providing a glowing effect, increasing a glowing effect, providing a flickering effect, providing a fire or flame effect, and/or the like.

Additionally, the player interface, e.g., via the proximity sensing system 100, can be configured so as to be operable to provide different themes (e.g., look and feel of the display) either based on the player tracking profile and/or selected by the player 24. In this manner, the player interface (e.g., display, keypad, and/or the like) can be customized to a particular player's liking.

Also, the player interface, e.g., via the proximity sensing system 100, can be configured so as to be operable to accept the use of traceable input, such as but not limited to traceable signatures. By way of a non-limiting example, the player 24 can trace his/her signature on the display panel, keypad, and/or and other component (e.g. without ever touching the display panel, keypad, and/or and other component) so as provide authorization for various casino services.

In accordance with another aspect of the present invention, it is envisioned that the player tracking card itself can be eliminated or at least its need to be physically present would be lessened, regardless of whether proximity sensing technology is employed or not. By way of a non-limiting example, instead of using the player tracking card, the player 24 would input (e.g., either with touch or without touch) an appropriate amount of data (e.g., a player number, a code number, a player identification name, and/or the like) and then a PIN number and/or the like, into an available data input device (e.g., a display screen, keypad and/or the like), and if successfully accomplished, would be granted access to the gaming machines.

Obviously, many modifications and variations of the present invention are possible in light of the above teachings. The invention may be practiced otherwise than as specifically described within the scope of the appended claims

What is claimed is:

1. A player tracking device for providing a player interface to a player of a gaming machine, the player tracking device coupled to the gaming machine, comprising:
   a processor;
   a touchless display coupled to the processor, the touchless display configured to display a plurality of images within a display area, the plurality of images including input images displaying corresponding gaming input parameters and non-input informational images displaying gaming information, the input images being displayed in a different area of the display area than the non-input informational images; and
   a touchless input interface including a proximity sensor, the touchless input interface coupled to the processor and being implemented by the touchless display, the touchless input interface configured to register a proximity of a player's finger with respect to the touchless display and sense the player's finger at a first proximity depth and at a second proximity depth that is nearer to the touchless display than the first proximity depth, the processor configured to:

detect the player's finger being a predefined proximity depth away from the touchless display;

determine a location of the player's finger within the display area;

determine if the player's finger is positioned over a non-input informational image and responsively modify the non-input informational images to enlarge the gaming information being displayed with the non-input informational images when the player's finger is at the first proximity depth; and determine if the player's finger is positioned over an input image and responsively:

initiate an activating feature including providing a tactile feedback to the player when the player's finger is at the first proximity depth; and indent the input image displayed by the touchless display, determine an input parameter associated with the input image, and generate and transmit the input parameter to a host computer to initiate a corresponding player command when the player's finger is at the second proximity depth.

2. The device, as in claim 1, wherein the processor is further configured to provide an aural sound effect to notify the player of a player's selection of the input image when the player's finger is at the second proximity depth.

3. The device, as in claim 1, the proximity sensor including a plurality of spaced electrodes, each of the spaced electrodes being associated with each of the plurality of images, the processor configured to select an image associated with the player's finger as a function of the loading difference associated with each of the electrodes.

4. The device, as in claim 1, wherein the touchless input interface detects a person passing near the gaming machine, and communicates to the processor to affect the display by displaying at least one of lights, sounds, videos, and animations.

5. The device, as in claim 1, wherein the modification of the non-input informational image is a function of the size of the non-input informational image displayed in relation to the player's proximity to the interface.

6. The device, as in claim 5, the processor further configured to increase the size of the non-input informational image displayed by the touchless display as a function of the player's proximity to the interface.

7. The device, as in claim 5, the processor further configured to display the non-input informational image including information associated with game rules.

8. The device, as in claim 1, wherein the modification of the non-input informational image is a function of the scale of the non-input informational image displayed in relation to the player's proximity to the interface.

9. The device, as in claim 8, the processor further configured to increase the scale of the non-input informational image displayed by the touchless display as a function of the player's proximity to the interface.

10. The device, as in claim 8, the processor further configured to increase the scale of the non-input informational image to a predefined size.

11. The device, as in claim 1, wherein the input image is a button with a specific function for the processor to carry out.

12. The device, as in claim 11, wherein the specific function for the processor to carry out is one of selecting a game, placing a wager, and requesting casino services.

13. The device, as in claim 11, the touchless display including a bezel coupled to the display having a modifiable parameter for indicating information.

14. The device, as in claim 13, the modifiable parameter being color.

15. A method of using a player tracking device including a processor, a touchless display, and a touchless input interface including a proximity sensor and comprising the steps of:

coupling the touchless display to the processor;

coupling the touchless input interface to the processor;

displaying, by the processor, a plurality of images within a display area on the touchless display, the plurality of images including input images displaying corresponding input parameters and non-input informational images displaying gaming information, the input images being displayed in a different area of the display area than the non-input informational images;

associating the images with the touchless input interface;

registering a proximity of a player's finger in relation to the touchless display including sensing the player's finger at a first proximity depth and at a second proximity depth that is nearer to the touchless display than the first proximity depth;

detecting the player's finger being a predefined proximity depth away from the touchless display;

determining a location of the player's finger within the display area;

determining if the player's finger is positioned over a non-input informational image and responsively modifying the non-input informational image to enlarge the gaming information being displayed with the non-input informational image when the player's finger is at the first proximity depth; and determining if the player's finger is positioned over an input image and responsively:

initiating an activating feature including providing a tactile feedback to the player when the player's finger is at the first proximity depth; and indenting the input image on the touchless display, determining an input parameter associated with the input image, and generating and transmitting the input parameter to a host computer to initiate a corresponding player command when the player's finger is at the second proximity depth.

16. The method, as in claim 15, the method further including the steps of providing an aural sound effect to notify the player of a player's selection of the input image when the player's finger is at the second proximity depth.

17. The method, as in claim 15, including the steps of: detecting a person passing near the gaming machine and displaying by displaying at least one of lights, sounds, videos, and animations.

18. The method, as in claim 15, the proximity sensor further including a including a plurality of spaced electrodes, each of the spaced electrodes being associated with each of the plurality of images, the method further including the steps of:

detecting a loading difference of each of the electrodes; and selecting an image associated with the player's finger as a function of the loading difference associated with each of the electrodes.

19. The method, as in claim 15, wherein the modification of the non-input informational image is a function of the size of the non-input informational image displayed in relation to the player's proximity to the interface.

20. The method, as in claim 19, the method further including the step of increasing the size of the non-input informational image displayed by the touchless display as a function of the player's proximity to the interface.

21. The player tracking device, as in claim 15, the method further including the step of displaying the non-input informational image including information associated with game rules.

22. The method, as in claim 15, wherein the modification of the non-input informational image is a function of the scale of the non-input informational image displayed in relation to the player's proximity to the interface.

23. The method, as in claim 22, the method further including the step of increasing the scale of the non-input informational image displayed by the touchless display as a function of the player's proximity to the interface.

24. The method, as in claim 22, the method further including the step of increasing the scale of the non-input informational image to a predefined size.

25. The method, as in claim 15, the method further including the step of displaying the input image including a button with a specific function for the processor to carry out.

26. The method, as in claim 25, wherein the specific function for the processor to carry out is one of selecting a game, placing a wager, and requesting casino services.

27. The method, as in claim 25, the touchless display including a bezel coupled to the display having a modifiable parameter for indicating information.

28. The method, as in claim 25, wherein the modifiable parameter is color, the method including the step of modifying the color of the bezel as a function of the player's game play.

29. A non-transitory information recording medium on which a computer readable program is recorded that causes a computer to function as a player tracking device for providing a player interface to a player of a gaming machine, the player tracking device coupled to the gaming machine, comprising:

a processor;

a touchless display coupled to the processor, the touchless display configured to display a plurality of images within a display area, the plurality of images including input images displaying corresponding input parameters and non-input informational images displaying gaming information, the input images being displayed in a different area of the display area than the non-input informational images; and a touchless input interface including a proximity sensor, the touchless input interface coupled to the processor and being implemented by the touchless display, the touchless input interface configured to register a proximity of a player's finger with respect to the touchless display and sense the player's finger at a first proximity depth and at a second proximity depth that is nearer to the touchless display than the first proximity depth, the processor configured to:

detect the player's finger being a predefined proximity depth away from the touchless display;

determine a location of the player's finger within the display area;

determine if the player's finger is positioned over a non-input informational image and responsively modify the non-input informational image to enlarge the gaming information being displayed with the non-input informational image when the player's finger is at the first proximity depth; and determine if the player's finger is positioned over an input image and responsively:

initiate an activating feature including providing a tactile feedback to the player when the player's finger is at the first proximity depth; and indent the input image displayed by the touchless display, determine an input parameter associated with the input image, and generate and transmit the input parameter to a host computer to initiate a corresponding player command when the player's finger is at the second proximity depth.

* * * * *